UNITED STATES PATENT OFFICE.

ANTONIUS FOSS, OF CHRISTIANIA, NORWAY, ASSIGNOR TO NORSK HYDRO-ELEKTRISK KVAELSTOFAKTIESELSKAB, OF CHRISTIANIA, NORWAY.

METHOD OF MANUFACTURING PHOSPHATE FERTILIZER CONTAINING NITROGEN.

1,292,293.   Specification of Letters Patent.   Patented Jan. 21, 1919.

No Drawing.   Application filed May 8, 1917.   Serial No. 167,338.

*To all whom it may concern:*

Be it known that I, ANTONIUS FOSS, a subject of the King of Norway, residing at Christiania, in the Kingdom of Norway, have invented certain new and useful Improvements in Methods of Manufacturing Phosphate Fertilizer Containing Nitrogen; and I do hereby declare the following to be a full, clear, and exact description of the invention, such as will enable others skilled in the art to which it appertains to make and use the same.

The invention relates to a method of preparing a fertilizer immediately ready for use by treating phosphate rock or similar raw material with nitric acid.

Phosphate fertilizers containing nitrogen in the form of nitrates can be made by mixing nitrates with ready prepared phosphate fertilizers.

It has already been proposed to render phosphates soluble by means of dilute nitric acid, to neutralize the acid solution and to evaporate the mixture of diphosphate and nitrates thus obtained to such an extent that it will congeal on cooling. Another proposal in effect, directly evaporating the acid solution, is difficult to carry out as the liquor will strongly attack the plant and also losses of nitric acid will easily occur. Both these methods involve a costly after-treatment of the soluble product immediately obtained in order to convert it into a solid fertilizer capable of being satisfactorily spread.

Hitherto no process for rendering phosphates soluble by means of nitric acid is known that is as equally rational as the method of treating such phosphates with sulfuric acid used in the manufacture of superphosphates by which the product from the acid treatment is immediately obtained in the dry state. Experiments that have been made in this direction have only given pasty masses, which have to be transformed into the dry state either by subsequent heating or by admixture of water-absorbing substances such as gypsum, pulverized peat and the like in order to be fit for spreading. Such admixtures however, enhance the price of the fertilizer and lower its percentage of the valuable constituents, phosphoric acid and nitrogen.

I have now ascertained certain novel conditions under which the phosphate material can be rendered soluble by means of nitric acid in such a manner, that a dry product is immediately obtained and only a disintegrating operation is required to make a merchantable article.

The said conditions are firstly, that use is made of nitric acid of such a concentration, that no more water is supplied to the mass, than the latter can absorb. Then it is of particular importance that the product shall contain sufficient quantities of calcium nitrate as being in this case the water-binding substance and corresponding in this respect to the gypsum of the ordinary superphosphate. According to the invention this latter condition is realized by using for the process a raw-material containing calcium carbonate. The calcium carbonate can be added to the phosphatic raw-material before treating it with nitric acid. Experience has, however, proved, that several sorts of native crude phosphates occur, that have such a content of calcium carbonate that they can be used without any admixture.

The strength of the acid used and the percentage of carbonate present in the crude material are interdependent and the quantity and strength of the acid must be adapted for the special raw-material being treated. Very often an acid of about 55–60 per cent. will be found convenient.

The raw-phosphate containing carbonate is then treated with so much nitric acid of the proper strength that a maxium of soluble components is obtained and after completion of the reaction (solution and water-binding) a solid mass results. During the reaction some nitrogen oxids and vapors of nitric acid will escape and must be recovered. On account of the evolution of carbon dioxid in the mass the latter will be porous and retain some nitrogen oxids. In order to recover these oxids, the mass may be stirred while still semiliquid or pasty, a current of air being simultaneously blown through, or the mass may for a short time be exposed to a vacuum in order to make the nitrogen oxids escape.

When the mass has solidified, it can immediately be pulverized and packed. The product contains beside calcium nitrate water-soluble phosphoric acid and a very small amount of insoluble phosphates.

The advantages of the process above described are obvious. Phosphates are rendered soluble by means of nitric acid in such a manner that a fertilizer is obtained which may be used without any further treatment just as the common superphosphate obtained in treating phosphates with sulfuric acid, but having the merit as compared with superphosphate that it does not contain any dead weight of useless constituents.

I claim:

The method of manufacturing fertilizer containing nitrogen, which consists in adding sufficient nitric acid to raw-phosphates associated with carbonate of calcium to render them soluble, stirring the mass while in a semi-liquid state, and simultaneously passing a current of air therethrough.

ANTONIUS FOSS.

Witnesses:
KARL L. LEE,
C. VARMAN.